US012518636B2

(12) United States Patent
Grimald et al.

(10) Patent No.: US 12,518,636 B2
(45) Date of Patent: Jan. 6, 2026

(54) SYSTEM FOR CALCULATING A MISSION OF AN AIRCRAFT BY COMBINATION OF ALGORITHMS AND RELATED METHOD

(71) Applicant: DASSAULT AVIATION, Paris (FR)

(72) Inventors: Cyrille Grimald, Saint Cloud (FR); Benoit Urien, Saint Cloud (FR)

(73) Assignee: DASSAULT AVIATION, Paris (FR)

( * ) Notice: Subject to any disclaimer, the term of this patent is extended or adjusted under 35 U.S.C. 154(b) by 85 days.

(21) Appl. No.: 16/508,263

(22) Filed: Jul. 10, 2019

(65) Prior Publication Data

US 2020/0020237 A1    Jan. 16, 2020

(30) Foreign Application Priority Data

Jul. 11, 2018  (FR) ...................................... 18 00734

(51) Int. Cl.
 *G08G 5/32* (2025.01)
 *G08G 5/50* (2025.01)
 *G08G 5/55* (2025.01)

(52) U.S. Cl.
 CPC ................ *G08G 5/32* (2025.01); *G08G 5/50* (2025.01); *G08G 5/55* (2025.01)

(58) Field of Classification Search
 CPC .. G08G 5/0034; G08G 5/0047; G08G 5/0091; G08G 5/0013; G08G 5/0021;

(Continued)

(56) References Cited

U.S. PATENT DOCUMENTS 5,526,000 A * 6/1996 Chazelle .............. G05D 1/0646
                                                                         342/407
6,163,744 A    12/2000 Onken et al.
(Continued)

FOREIGN PATENT DOCUMENTS

EP         0892962 A1     1/1999
FR         2918471 A1     1/2009
(Continued)

OTHER PUBLICATIONS

Search Report for priority application FR1800734.
(Continued)

*Primary Examiner* — Aniss Chad
*Assistant Examiner* — Christopher George Fees
(74) *Attorney, Agent, or Firm* — Davidson Kappel LLC

(57) ABSTRACT

A system for calculating a mission of an aircraft by combination of algorithms includes a first path calculation module, configured for calculating an optimal mission path between a geographical point of origin and a geographical destination point as a function of airplane performance, operational mission specifications and a weather context. The first calculation module is configured to determine the optimal path in a manner non constrained by a network of waypoints and/or imposed paths between the waypoints. The system includes a definition module, around the optimal path, an optimization region of the path and a second path calculating module, configured to calculate an optimized path of the aircraft in the optimization region in a manner constrained by a network of waypoints and/or imposed paths between the waypoints.

20 Claims, 10 Drawing Sheets

(58) Field of Classification Search
CPC .... G08G 5/0039; G08G 5/0052; G08G 5/006; G06Q 10/04; G06Q 50/30; B64D 45/00; B64D 47/00; G01C 21/00; G01C 21/20; G05D 1/0005; G05D 1/00

See application file for complete search history.

(56) References Cited

U.S. PATENT DOCUMENTS

| | | | |
|---|---|---|---|
| 6,266,610 | B1 | 7/2001 | Schultz et al. |
| 2008/0021635 | A1 | 1/2008 | Lohmiller et al. |
| 2013/0046422 | A1 | 2/2013 | Cabos |
| 2016/0078769 | A1* | 3/2016 | Coulmeau ................ G08G 5/21 701/537 |
| 2016/0093222 | A1 | 3/2016 | Hale |
| 2016/0210866 | A1 | 7/2016 | Pierre et al. |
| 2016/0225265 | A1* | 8/2016 | Pierre .................... G01C 23/00 |
| 2017/0011636 | A1* | 1/2017 | Nefflier ..................... G06F 8/20 |
| 2017/0227955 | A1 | 8/2017 | Krupansky et al. |
| 2018/0090015 | A1* | 3/2018 | Mere ....................... G08G 5/723 |
| 2018/0144643 | A1* | 5/2018 | Moravek .............. G08G 5/0021 |
| 2019/0164438 | A1 | 5/2019 | Grimald |
| 2020/0118448 | A1 | 4/2020 | Figlar et al. |
| 2020/0302805 | A1 | 9/2020 | Grimald et al. |

FOREIGN PATENT DOCUMENTS

| | | | |
|---|---|---|---|
| FR | 3031806 | A1 | 7/2016 |
| FR | 3032271 | A1 | 8/2016 |
| FR | 3056778 | A1 | 3/2018 |
| WO | WO9729438 | | 8/1997 |
| WO | WO-9917080 | A1 * | 4/1999 ......... G01C 21/3492 |

OTHER PUBLICATIONS

Raghuveer Devulapalli: "An Efficient Algorithm for Commercial Aircraft Trajectory Optimization in the Air Traffic System", Jan. 1, 2012, URL:https//conservancy.umn.edu/bitstream/handle/11299/140007/DevulPlli_umn_0130M_12966.pdf;sequence=1.

Zvi Shiller: "Off-Line and On-Line Trajectory Planning" In: Mechanisms, Transmissions and Applications, Jan. 1, 2015, vol. 29, pp. 29-62.

* cited by examiner

SYSTEM FOR CALCULATING A MISSION OF AN AIRCRAFT BY COMBINATION OF ALGORITHMS AND RELATED METHOD

The present disclosure relates to a system for calculating a mission of an aircraft, including a calculating engine for calculating aircraft paths during the mission, comprising a first path calculating module, configured for calculating an optimal mission path between a geographical point of origin and a geographical destination point as a function of airplane performances, operational mission specifications and a weather context, preferably evolutive, in a mission space between the geographical point of origin and the geographical destination point.

Such a calculating system is in particular intended to be integrated into a cockpit, in parallel with a flight management system (FMS), to allow the crew to determine mission paths.

In a variant, the computing system is configured to be integrated into an offboard mission planning system, for example into an aircraft path establishment airport infrastructure, an electronic flight bag (EFB), and/or in a portable electronic device (for example a tablet), or in a computer of the PC type.

The calculating system is configured for determining at least one route of the aircraft over at least one segment at a given flight level. Advantageously, the calculating system is configured to determine a complete path of the aircraft on several different flight levels between a first geographical point of origin and a second geographical destination point, the mission being configured to comprise one or several steps.

The preparation and definition of an aircraft mission between a first geographical point and a second geographical point is a time-consuming task. It in particular requires determining the route that the aircraft will follow, the associated flight profile, the passenger, freight and fuel load, and calculating the low-speed performance, as well as verifying the flight envelope of the aircraft.

This definition is done based on a mission context including the weather, the airways to be followed, the connectivity with satellite communications systems and an airplane context that includes the configuration and type of aircraft used, as well as its operating state.

BACKGROUND

Generally, in civil aviation, airlines and/or outside suppliers have computing systems making it possible to provide a flight plan and expected aircraft performance, for example a required quantity of fuel.

In business aviation, the constraints weighing on the crew are considerable and specific. Clients sometimes require the crew to respect stricter mission criteria, for example regarding passenger comfort during the flight, the possibility of connecting to satellite transmission systems, mass offered by the airplane, etc.

Furthermore, the mission conditions, in particular takeoff schedules, are subject to change and the destination may change quickly based on passengers' own needs.

In this context, the existing systems for providing flight plans are not fully satisfactory.

In particular, these systems are designed to operate on a sum of input criteria (speed, flight level, number of passengers, etc.) to which only one navigation solution will correspond. It is therefore frequently necessary to perform several iterations to adjust the mission hypotheses.

The results obtained by the systems of flight plan providers are further generally incomplete regarding the criteria required to perform the mission, in particular in managing client criteria, the airplane context and performance.

As a result, the path solutions proposed by the provider are not satisfactory for the client and/or result in a nonoptimal flight time and/or in an increased fuel consumption.

SUMMARY OF THE INVENTION

A system for calculating a mission of an aircraft is provided that allows the crew to find an optimized path easily by taking into account the current state of the aircraft, criteria imposed by the client, and mission volume constraints, in particular including the airways and the weather.

To that end, a system of the aforementioned type is provided, characterized in that the first path calculating module is configured to calculate the optimal mission path in a manner non constrained by an array of waypoints and/or paths imposed between the waypoints;

the calculating engine including:
  a module for defining, around the optimal mission path, an optimization region of the path, and
  a second path calculating module, configured to calculate an optimized path of the aircraft in the optimization region in a manner constrained by a network of waypoints and/or imposed paths between the waypoints, taking the weather context into account.

The system according to the invention may comprise one or more of the following features, considered alone or according to any technically possible combination:
  the optimization region of the path is defined as a function of a predetermined lateral distance from each point of the optimal path and as a function of the operational mission specifications;
  the optimization region of the path is delimited by lateral limits extending laterally at a distance chosen as a function of the density of the network of waypoints and/or paths imposed between the waypoints;
  the second path calculating module is configured to define, in the optimization region of the path, a network of nodes between the geographical point of origin and the geographical destination point from the network of waypoints and/or imposed paths between the waypoints, to define a cost associated with the passage from one node to an adjacent node among the nodes of the network and to determine the optimized path based on a minimization of the total cumulative cost between the geographical point of origin and the geographical destination point;
  the second path calculating module is configured to implement a Dijkstra algorithm and/or an A* algorithm;
  the first path calculating module is configured to calculate at least one iso-movement curve of the aircraft, in particular at least one isochronous curve and/or at least one fuel iso-consumption curve from at least one point of the path, in particular at least the geographical point of origin, and is configured to determine at least one other point of the path on the iso-movement curve of the aircraft;
  each point of the path is located on an iso-movement curve relative to another point of the path, the calculating module being configured for choosing each point of the path on the iso-movement curve as a function of operational and/or performance airplane specifications;

the first path calculating module is configured to compute a plurality of iso-movement curves on several flight levels from the point of the path;

the first path calculating module is configured to determine the iso-movement curves corresponding to a plurality of flight levels from an initial point to a first flight level change curve to define at least a first path segment for each flight level, then the iso-movement curves from the first flight level change curve for a plurality of flight levels to another flight level change curve to define at least a second path segment for each flight level, then next to define at least one optimal path by combining successive path segments chosen from among the path segments defined for each plurality of flight levels;

the first path calculating module is configured to divide the space into a plurality of angular sectors from the geographical point of origin or from the geographical destination point, and to select each point of an iso-movement curve at a given moment relative to a point of an iso-movement curve at an earlier moment as the point located at a maximum distance from the geographical point of origin or at a minimum distance from the geographical destination point in each angular sector;

said system according to the aforementioned type includes;

a module for initializing specifications of a mission including at least a geographical point of origin, a geographical destination point, and operational mission specifications;

a module for recovering a weather context, in particular an evolutive weather context, in a mission volume extending between the geographical point of origin and the geographical destination point;

a module for determining airplane performance, configured for determining airplane performance based on operational mission specifications and the weather context; and the or each operational specification includes an airplane context, in particular a type of defective equipment, a dispatch or a failure, and/or includes a mission context, in particular a weather zone to avoid, a prohibited zone or a desired passage zone;

the first path calculating module is configured to calculate the optimal mission path as if the aircraft was able to perform a free flight taking account of mission specifications, without accounting for a network of waypoints and/or imposed paths between the waypoints;

the network of waypoints and/or imposed paths between the waypoints is defined by air traffic control authorities.

A method for calculating a mission of an aircraft is also provided, using a mission calculating system including an engine for calculating paths of the aircraft during the mission, the method including the following steps:

calculating, via a first path calculating module of the calculating engine, a first optimal mission path between a geographical point of origin and a geographical destination point as a function of airplane performance, operational mission specifications and a weather context, preferably evolutive, in a mission space between the geographical point of origin and the geographical destination point.

the calculation of the optimal mission path being done in a manner non constrained by a network of waypoints and/or imposed paths between the waypoints;

defining, via a definition module of the calculating engine, an optimization region of the path around the first optimal mission path; and calculating, via a second path calculating module, an optimized path of the aircraft in the optimization region in a manner constrained by a network of waypoints and/or imposed paths between the waypoints, taking the weather context into account.

The method according to the invention may comprise one or more of the following features, considered alone or according to any technically possible combination:

the optimization region of the path is defined as a function of a predetermined lateral distance from each point of the optimal path and as a function of the operational mission specifications; and the calculation of the optimized path includes defining, in the optimization region, a network of nodes between the geographical point of origin and the geographical destination point from the network of waypoints and/or imposed paths between the waypoints, defining a cost associated with the passage from one node to an adjacent node among the nodes of the network and determining the optimized path based on a minimization of the total cumulative cost between the geographical point of origin and the geographical destination point;

the first path calculating module calculates the optimal mission path as if the aircraft was able to perform a free flight taking account of mission specifications, without accounting for a network of waypoints and/or imposed paths between the waypoints;

the network of waypoints and/or imposed paths between the waypoints is defined by air traffic control authorities.

BRIEF SUMMARY OF THE DRAWINGS

The invention will be better understood upon reading the following description, provided solely as an example and done in reference to the appended drawings, in which.

DETAILED DESCRIPTION

Figure 1:
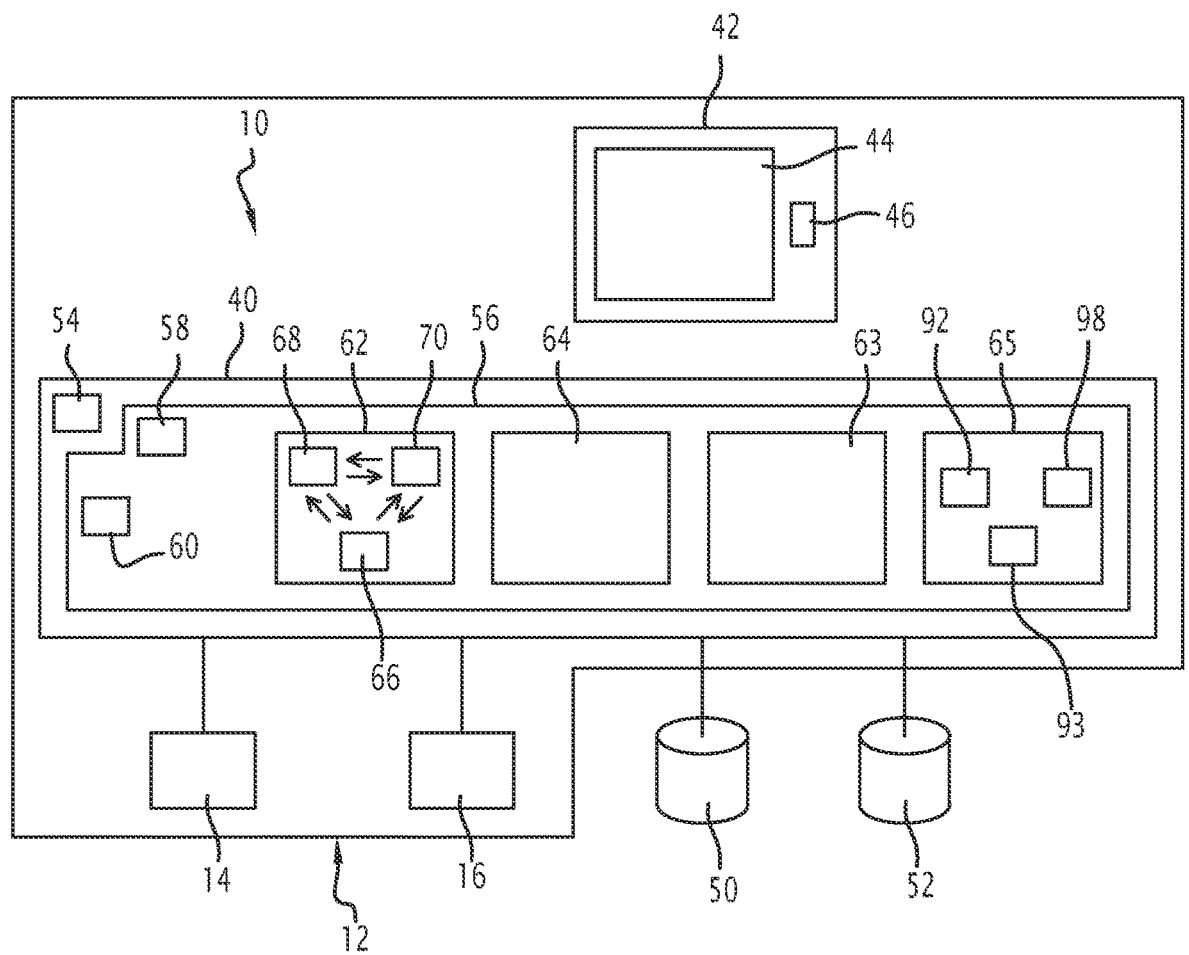
FIG. 1 is a block diagram illustrating a first mission calculating system according to an embodiment of the invention.

A first mission calculating system 10 according to an embodiment of the invention, which, in this example, is present in the cockpit 12 of an aircraft, is illustrated by FIG. 1.

The aircraft is preferably a civilian aircraft, preferably a business plane.

In a known manner, the cockpit 12 of the aircraft is intended to control all of the systems of the aircraft during its use.

The cockpit 12 in particular includes, aside from the mission calculating system 10, a flight management system (FMS) 14 and a system 16 for managing and monitoring the various airplane systems.

The flight management system 14 is intended to aid the pilot of the aircraft in navigating the aircraft during a mission. It is configured to provide information in particular on the route followed by the aircraft, and the evolution parameters of the aircraft, such as the fuel consumption.

Figure 4:
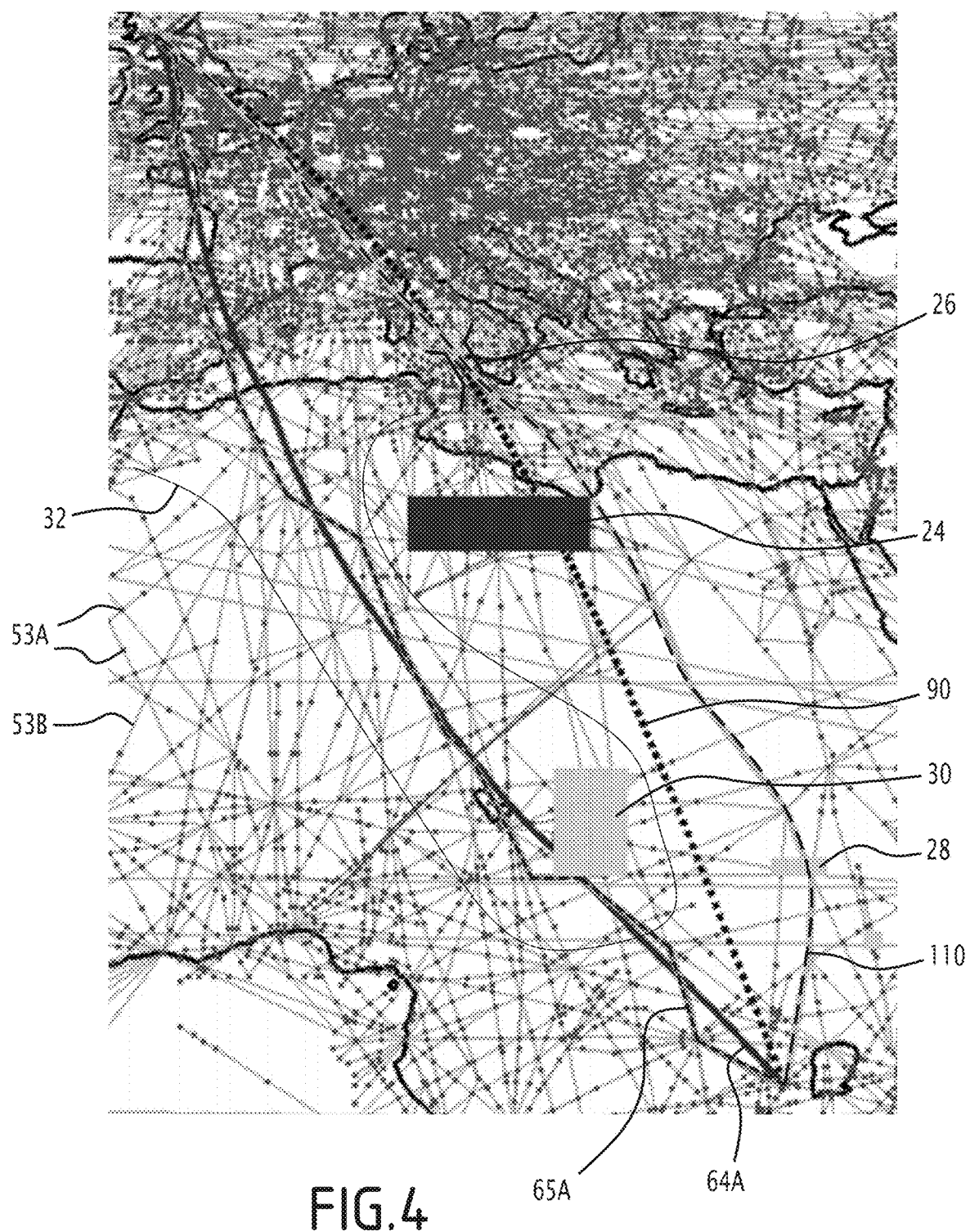
FIG. 4 is a view illustrating an orthodromic path, a path provided by a traditional provider, a path in free flight obtained by the isochronous method, and a path obtained by the inventive method.

It is also configured to guide the aircraft to cause it to follow a preset trajectory between a first geographical point of origin 18 and a second destination geographical point 20 (shown schematically in FIG. 4).

The system 16 for managing and monitoring the various airplane systems is in particular intended to allow the crew to monitor and optionally control all of the aircraft systems. It is in particular configured for determining an operating state of the aircraft, in particular in the presence of flaws and failures present on the aircraft on the ground and/or in flight. As will be seen below, the mission calculating system 10 according to an embodiment of the invention is connected to the system 16 for taking the state of the airplane into account in mission calculations.

The mission carried out by the aircraft comprises at least one step 22 (or leg) between a first geographical point of origin 18 and a second destination geographical point 20. In some cases, the mission performed by the aircraft includes a plurality of successive legs 22, the second geographical destination point 20 of a first leg constituting the first geographical point of origin 18 of a second leg.

The mission is performed by following operational specifications that in particular comprise a mission context and an airplane context.

The mission context for example includes at least one operating constraint, in particular a number of passengers to be carried, a maximum weight at takeoff in particular related to an available runway length, a navigation fuel load, a reserve fuel load, an imposed takeoff time and/or arrival time, a maximum distance to be traveled and/or a distance to an alternative terrain en route.

Figure 2:
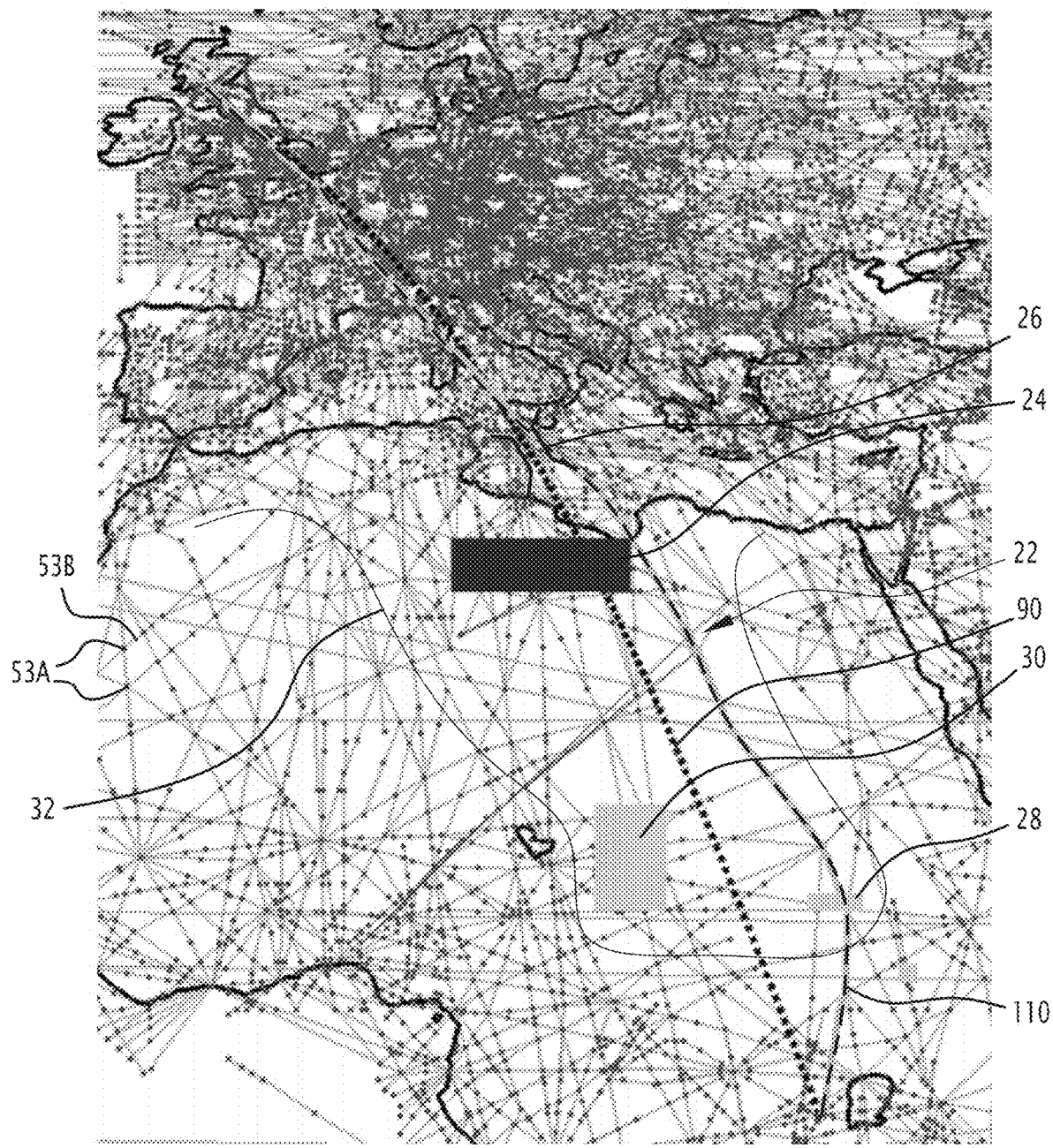
FIG. 2 is a schematic view of a navigation zone of the aircraft in which there are regions not meeting the mission constraints and regions not meeting the mission criteria.

In reference to FIG. 2, the mission context advantageously comprises navigation constraints, for example prohibited zones 24 or flight levels, imposed airways 26 or flight levels, or more globally free flight zones and/or flight zones imposed by the airways.

The mission context advantageously comprises weather constraints such as dangerous weather phenomena zones 28, in particular ice formation or cumulonimbus.

The mission context optionally comprises passenger comfort constraints, in particular turbulence zones 30 to be avoided, in particular based on the desired turbulence level, for example chosen from a low level, a medium level, and a high level of turbulence, or satellite telecommunications coverage zones 32 in order to allow telecommunications between the aircraft and the outside world in particular on the ground, in particular chosen from among a low level, a medium level and a good level of communication possibilities.

The airplane context may comprise usage constraints related to dispatches and/or constraints related to a particular state of the aircraft in terms of defects and/or failures on one or several pieces of equipment of the aircraft.

For example, a dispatch related to certain defects of the aircraft may impose a maximum flight level and/or a maximum speed. A failure to retract the landing gear or a flap may also impose an increased fuel consumption constraint.

The mission calculating system 10 is intended to establish a path of the aircraft to perform step 22 between at least a first geographical point of origin 18 and at least one second destination geographical point 20, taking account of the operational specifications, and in particular the mission context and the airplane context, while following the existing airways.

The path obtained using the mission calculating system 10 includes the route of the aircraft in latitude and longitude, at least one altitude level, advantageously with an altitude flight profile.

Advantageously, the mission calculating system 10 is further configured for establishing flight plan parameters, in particular the weight and balance of the aircraft, the takeoff and landing target (i.e., the flight data for the pilot relative to guiding such as the speeds V1, V2, VR on the runway, the acceleration upon releasing the brakes, the engine speed upon takeoff, and/or the attitude upon takeoff) as well as the calculation of the limit weights on takeoff and landing, the weather at low speed (i.e., on the surface) and high speed (i.e., en route), the air traffic control information ("Automated Terminal Information Service" ATIS, "Notice to airmen" e-NOTAM, "Flight Information RegionS" FIRS, air traffic control broadcasting services), and/or available alternative terrains at destination, and along the way.

In reference to FIG. 1, the mission calculating system 10 comprises a calculating engine 40 and advantageously a user interface 42 for configuring and retrieval forming a mission deck.

The user interface 42 for example comprises at least one screen 44 and at least one member 46 for selecting and entering information by the user, which can be a real or virtual keyboard, a mouse and/or a touch-sensitive system.

The user interface 42 is configured to allow the user to enter at least some of the operational specifications, in particular the geographical origin and destination points 18, 20, waypoints, desired times, desired loads, a maximum wind on the path, etc.

It is advantageously configured to allow the user to define at least a portion of the mission context, in particular the navigation and passenger comfort constraints, and/or to define at least a portion of the airplane context.

An example interface 42 is described in U.S. Pub. No.: 2019/0164440 A1, which is hereby incorporated by reference herein.

The calculating engine 40 is connected to the interface 42. It is advantageously also connected to the flight management system 14, to the management and monitoring system 16.

It is configured to query a weather database 50 and/or a navigation information database 52, for example via a data network, in particular a wireless data network.

The weather database 50 contains current and predictive weather information in the navigation zone of the aircraft in a mission volume extending between the point of origin 18 and the destination point 20. The mission volume preferably has a significant width, for example at least 700 nautical miles, on either side of the orthodromic path between the point of origin 18 and the destination point 20.

This weather data is provided on several flight altitude levels, for example every 304 m (1000 feet), at an altitude for example between 0 m and 15,545 m (51,000 feet).

The weather data is provided in terms of altitude, but also by providing a weather component evolving over time. This evolutive component is obtained using weather forecasting data, which can include a plurality of weather maps at successive moments over time (for example every hour).

This weather data in particular includes the speed and direction of the wind, temperature, pressure, precipitation, dangerous phenomena (ice, storms/cumulonimbus), turbulence, tropopause level, volcanic ash clouds, dust/sand clouds, visibility, as well as aeronautic observations over the zone or route (METAR, PIERPS) and zone forecasts (TAF), etc. It optionally includes the definition and evolution over time and space of the geographical coordinates of dangerous weather phenomena 28 and/or turbulence zones 30.

This weather data defines a weather context, which is preferably evolutive, in the mission volume extending between the geographical point of origin 18 and the geographical destination point 20.

The navigation information database 52 contains informational data on terrain at the point of origin 18 and the destination point 20, and between these points 18, 20. The navigation information database 52 advantageously comprises an airport sub-database (runway lengths, runway orientations, flight path angles, etc.) and a navigation sub-database. The navigation data in particular includes a network of waypoints 53A and the imposed paths 53B between the waypoints, as defined by the air traffic authorities in each country.

It advantageously contains the definition of the geographical coordinates of prohibited zones and/or flight levels 24, in particular due to geopolitical data, and/or imposed airways 26.

It optionally comprises the definition of satellite telecommunications (SATCOM) coverage zones 32.

The calculating engine 40 comprises at least one computer including at least a processor 54 and a memory 56. The memory 56 contains software modules configured for being executed by the processor 54.

In particular, the memory 56 contains a software module 58 for initializing mission specifications, configured for acquiring operational specifications of the mission in particular from the interface 42, and a software module 60 for recovering a weather context from the database 50.

The memory 56 further contains a software module 62 for determining airplane performance, as a function of mission specifications, the weather context and the airplane context.

The memory 56 also contains a first software module 64 for calculating a first optimal mission path 64A, based on determined airplane performance, the weather context and mission specifications, the first calculating module 64 being configured to calculate the first optimal mission path 64A unconstrained by a network of waypoints 53A and/or imposed paths 53B between the waypoints 53A.

The memory 56 also contains a module 63 for defining, around the first optimal mission path 64A, an optimization region 63A of the optimal path 64A and a second module 65 for calculating an optimized path 65A of the aircraft in the optimization region 63A, in a manner constrained by a network of waypoints 53A and/or imposed paths 53B between the waypoints 53A.

The initialization module 58 is configured for acquiring the operational specifications of the mission from the interface 42, and/or from the management and monitoring system 16.

The recovery module 60 is configured for querying the weather database 50 in particular to obtain the speeds and directions of the wind in the mission volume extending between the point of origin 18 and the destination point 20, at several flight levels.

The determining module 62 comprises a software application 66 for determining the weight and balance of the aircraft, intended to determine the center of gravity of the aircraft, a software application 68 for determining high-speed performance, and advantageously a software application 70 for determining low-speed performance.

The application 66 for determining the weight and balance of the aircraft is configured for determining the position of the center of gravity of the aircraft with no fuel in the aircraft (or Zero Fuel Weight Center of Gravity) and the weight of the aircraft with no fuel in the aircraft (or Zero Fuel Weight), based on the empty weight of the aircraft, equipment on board the aircraft, passengers and/or freight on board, and in their position in the aircraft, as well as monitoring of the flight envelope of the aircraft (weight-centering diagram).

The application for determining high-speed performance 68 is configured for determining the weight of fuel to be placed on board the aircraft on a given path, for example an orthodromic path 90 between the point of origin 18 and the destination point 20, using the position of the center of gravity and the weight of the aircraft with no fuel in the aircraft (or Zero Fuel Weight) determined by the application 66, a preset airspeed, for example entered or computed from data entered by the user interface 42, the weather context recovered from the module 60, in particular wind speeds and temperatures, and optionally the airplane context, for example the type and age of the engines, recovered from the initialization module 58.

The application for determining low-speed performance 70 is configured for determining in particular the maximum weight of the aircraft (and the takeoff target) allowing the aircraft to take off and/or land on terrain, based on runway length data recovered from the database 52, and the weather context recovered from the module 60.

The first calculating module 64 is configured to compute at least one iso-movement curve of the aircraft, in particular at least one isochronous curve and/or at least one fuel iso-consumption curve, from at least one point of the path, for example the geographical point of origin 18, and to determine the position of at least one other point of the path on the iso-movement curve of the aircraft.

The first calculating module 64 is configured to calculate at least one optimal path 64A (see FIGS. 3 and 4) between the point of origin 18 and the destination point 20, by determining iso-movement curves of the aircraft, in particular isochronous curves 80, in a manner non constrained by a network of waypoints 53A and/or imposed paths 53B between the waypoints.

Figure 5:
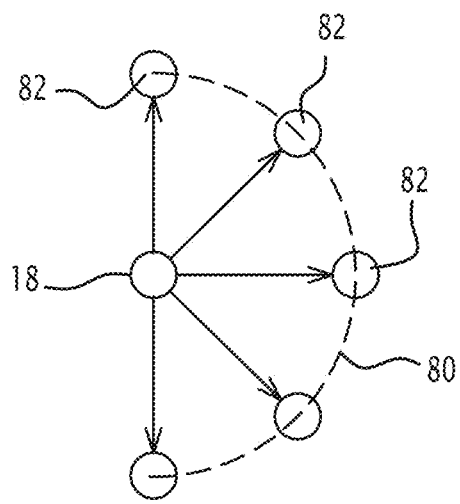
FIGS. 5 to 8 are schematic views illustrating the isochronous free path calculation principle in a first step of the inventive method.
Figure 8:
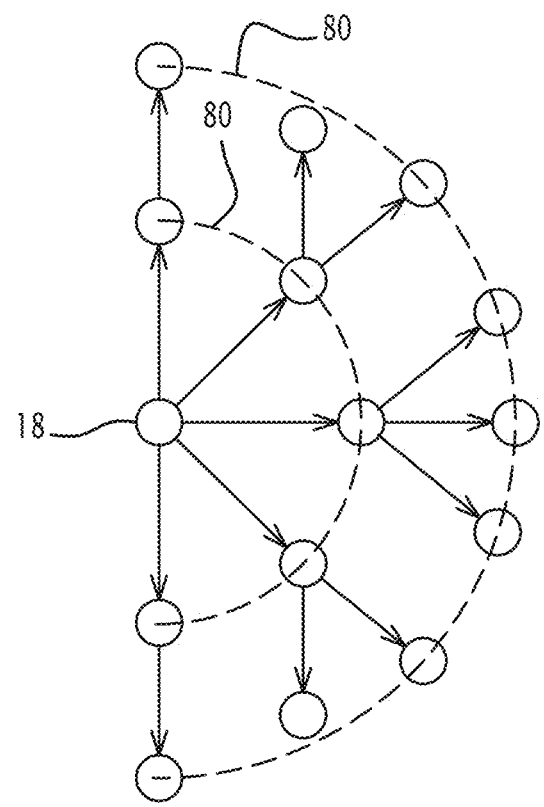

In the example illustrated by FIGS. 5 and 8, the first calculating module 64 is configured, from any point 82 of an already-determined isochronous curve, for establishing an isochronous curve 80 over a preset time increment from a point 82, taking account of the selected airspeed, the weather context, airplane performance determined by the determining module 62, in particular using the applications 66 and 68, and operational specifications defined by the initialization module 58. It is next configured to choose an optimal path 64A by basing itself on the determined isochronous curves 80.

By definition, an isochronous curve 80 is a curve connecting the points 84 accessible to the aircraft from a given point (which can be the point of origin 18 or a point 82 on an isochronous curve) at a given time, which corresponds to one or several time increments. Each time increment is for example between 1 minute and 1 hour, in particular between 2 minutes and 10 minutes, for example 5 minutes.

Figure 6:
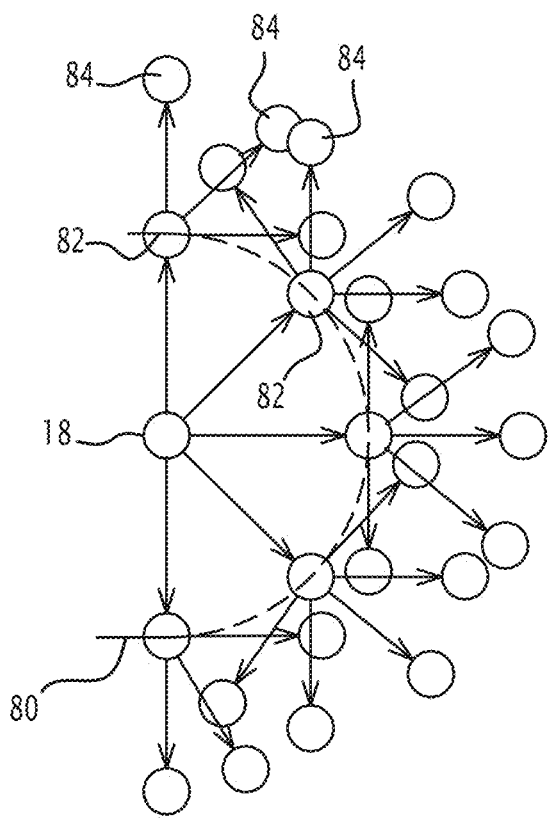

In this example, in reference to FIG. 6, each isochronous curve 80 is determined from a given point 82 by calculating, from the given point 82, all of the points 84 accessible to the aircraft, at a given airspeed, taking account of the weather context, in particular the wind direction and intensity, as provided by the recovery module 60 and the airplane performance, as determined by the determining module 62.

Figure 7:
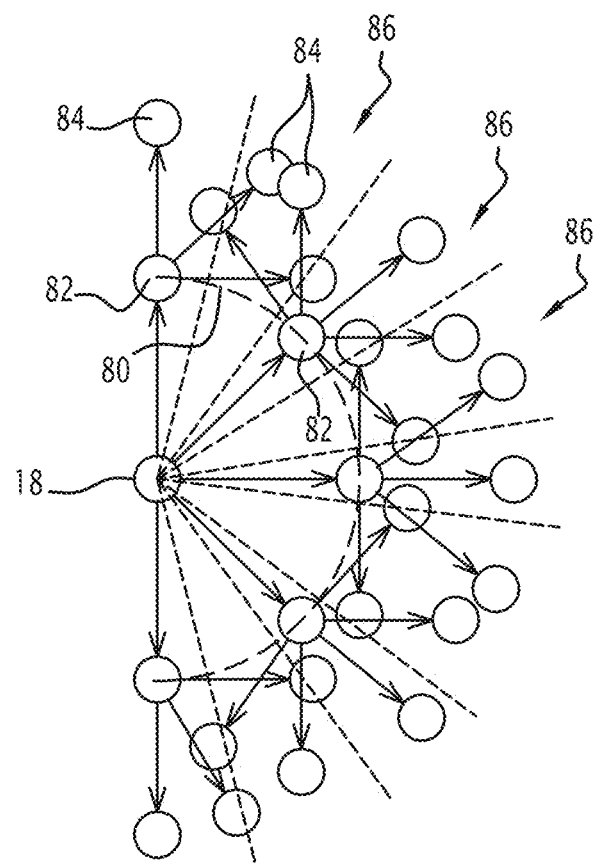

Advantageously, as illustrated by FIGS. 6 to 8, the calculating module 64 is configured to calculate a series of isochronous curves 80, by calculating, from each point 82 of a given isochronous curve 80, all of the points 84 accessible to the aircraft during a given time for the given speed and/or for the given fuel consumption, then repeating this calculation from any point 82 of the isochronous curve 80 thus calculated.

Advantageously, in the example illustrated by FIG. 7, the first calculating module 64 is configured to divide the space from the geographical point of origin 18 into separate angular sectors 86, then to select, in each angular sector 86, the point of maximum distance from the geographical point of origin 18 in this angular sector from among all of the points 84 accessible to the aircraft, located in this angular sector, during a given time increment.

Each angular sector for example has an angular expanse of less than 90°.

The first calculating module 64 is configured for selectively excluding the points that are located in the prohibited flight zones or levels 24, in zones 28 with dangerous weather phenomena and/or in turbulent zones 30. The calculating module 24 is also configured to exclude the points that are not located in a satellite coverage zone 32.

Nevertheless, the first calculating module 64 is configured to determine each point of the optimal path 64A in a manner non constrained by a network of waypoints 53A and/or imposed paths 53B between the waypoints 53A.

Thus, the determination of the optimal path 64A by the first path calculating module 64 is implemented as if the aircraft was able to perform a free flight taking account of mission specifications, but without accounting for a network of waypoints 53A and/or imposed paths 53B between the waypoints 53A that are defined by the air traffic control authorities.

Advantageously, the first calculating module 64 is configured to calculate the isochronous curves 80 from a point 82, located at a first flight level at the same flight level as the point 82, and at several flight levels adjacent to the first flight level above and below the first flight level, as described in the French patent application by the Applicant under no. 17 01235.

The first calculating module 64 is next configured to define an optimal path 64A by choosing, on the successive isochronous curves 80, successive points of the path 64A.

Figure 3:
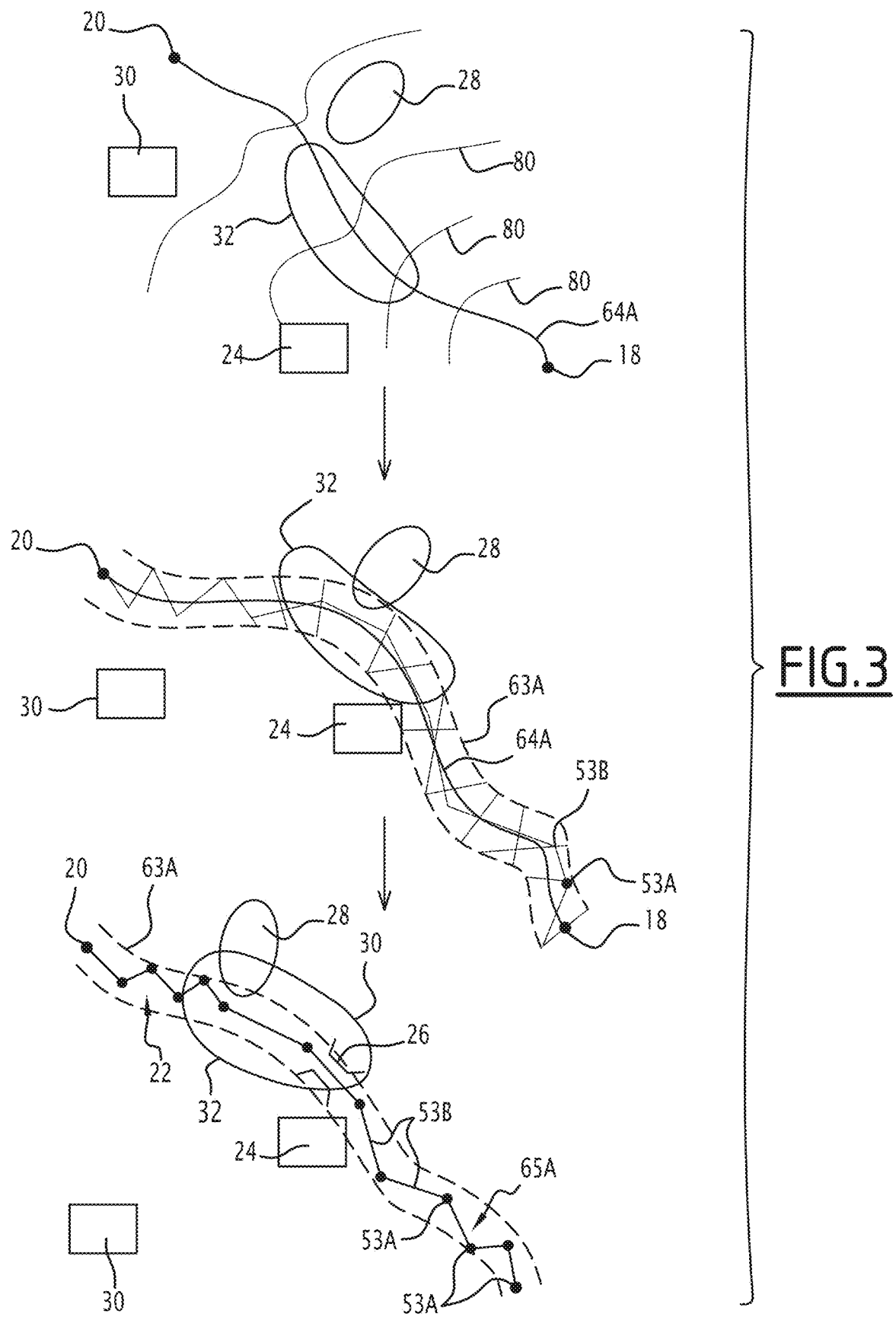
FIG. 3 is a schematic view illustrating the implementation principle of a mission calculation method according to an embodiment of the invention.

In reference to FIG. 3, the definition module 63 is configured to define the optimization region 63A of the path as a function of a predetermined lateral distance from each point of the optimal path 64A defined by the first calculating module 64 and as a function of the operational mission specifications, in particular the mission context, in particular navigation constraints, weather constraints, and passenger comfort constraints.

Advantageously, the definition module 63 is configured to laterally delimit the optimization region 63A of the path 64A by lateral limits extending laterally at a distance chosen as a function of the density of the air network of each point of the optimal path 64A.

This chosen distance is generally less than 1852 km (1000 nautical miles (nm)) and can for example be between 185 km (100 nm) and 926 km (500 nm) in a low-density network, for example in Africa, and between 183 km (99 nm) and 55 km (30 nm) in a high-density network, like in Europe.

Thus, the optimization region 63A is generally defined by a band encompassing the path 64A. The band is potentially also constrained by prohibited flight zones 24, dangerous weather phenomena zones 28 and/or turbulence zones 30. Depending on the case, it encompasses satellite coverage zones 32.

The second module 65 for calculating paths 65A includes an application 92 for defining a network 94 of nodes 96 (see FIG. 9) between the geographical point of origin 18 and the geographical destination point 20 from the network of waypoints 53A and/or imposed paths 53B between the waypoints 53A, and an application 93 for defining a cost associated with the passage from one node 96 to an adjacent node 96 from among the nodes 96 of the network 94.

The second calculating module 65 also includes an application 98 for determining the optimized path 65A in the network 94 of nodes 96 based on a minimization of the total cumulative cost between the geographical point of origin 18 and the geographical destination point 20.

The definition application 92 is configured to load the coordinates of waypoints 53A and imposed paths 53B between the waypoints 53A from the database 52, within the optimization region 63A.

The definition application 92 is configured to define, among the waypoints 53A, the nodes 96 that are the possible waypoints 53A for the aircraft in particular taking into account mission constraints, in particular navigation constraints, weather constraints, passenger comfort constraints, as defined above.

The definition application 93 is configured to define the cost associated with the passage between two adjacent nodes 96 based on the geographical distance separating the two nodes 96, and also the weather context recovered from the module 60, in particular the evolutive weather context and optionally the airplane context, for example the type and age of the engines, recovered from the initialization module 58.

The determination application 98 for the optimized path 65A is configured to implement a cost minimization algorithm in order to define the least expensive path in the optimization region 63A passing through the nodes 96 and through the imposed paths between the nodes 96, from the geographical point of origin 18 to the geographical destination point 20.

The algorithm is for example a Dijkstra algorithm and/or an A* algorithm. The Dijkstra algorithm uses, as input, the weighted network defined above between the geographical point of origin 18 and the geographical destination point 20. It gradually builds a sub-graph in which the different nodes 96 are classified by increasing order of their minimal cost at their geographical point of origin 18. The cost associated with each node 96 corresponds to the sum of the costs of the paths followed between the nodes 96.

Figure 9:
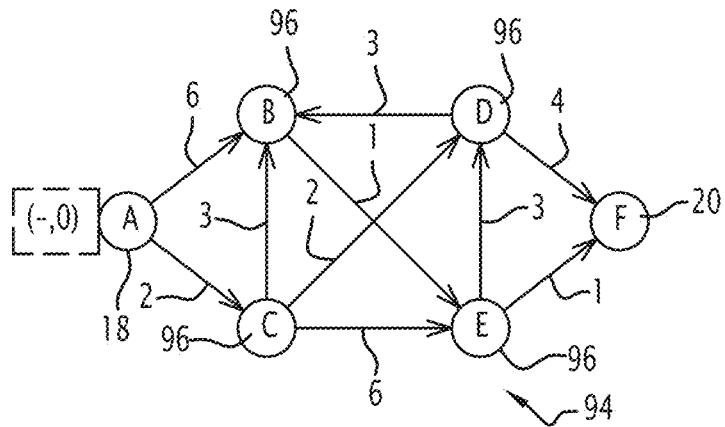
FIGS. 9 to 15 are schematic views illustrating the optimized path calculation principle in a constraint network, obtained from the free path in an optimization region of the path.

Before the first iteration, as illustrated by FIG. 9, the costs of each node 96 at the geographical point of origin 18 are infinite, except for the geographical point of origin 18 for which the cost is nil. The initial sub-graph is the empty set.

Figure 11:
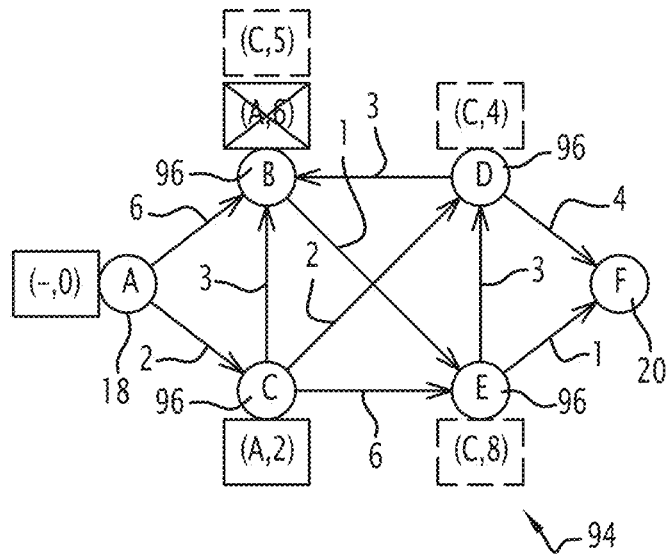

During each iteration, the determining application 98 chooses, outside the sub-graph, a node 96 of minimal cost and adds it to the sub-graph (see for example node C from node A surrounded by solid lines in FIG. 11). Next, the determining application 98 updates the costs associated with the nodes adjacent to that which is added (see for example nodes B and E from node C surrounded by dotted lines in FIG. 11). The new cost of the adjacent node 96 is obtained by adding the cost of the path between the adjacent node and the added node to the cost of the added node.

The determining application 98 thus continues until exhaustion of the nodes or until selection of the geographical destination point 20.

A description of the A* algorithm is given in the article downloadable at the following address: https://en.wikipedia.org/wiki/A*_search_algorithm.

Once the optimized path 65A is obtained, the calculating engine 40 is advantageously configured to determine at least one mission parameter of the aircraft corresponding to the optimized path 65A.

The mission parameter is for example a total weight of the aircraft at takeoff. This weight at takeoff is calculated by the software application 68 based on the estimated consumption on the path between the point of origin 18 and the destination point 20 and based on a passenger and freight load predefined in the operational specifications.

The calculating engine 40 is next configured to perform calculating iterations successively using the applications 66, 68, by determining, in each iteration, a new optimal path 64A via the first calculating module 64, a new optimization region 63A using the determination module, then a new optimized path 65A using the second calculating module 64, until reaching a convergence on the value of the mission parameter.

Upon each iteration, the calculating engine 40 is in particular configured to verify that the weight at takeoff obtained using the applications 66, 68 is less than or equal to the maximum weight allowing the aircraft to takeoff obtained using the application 70 to ensure that the aircraft can take off on the terrain chosen for takeoff.

Once the final optimized path 65A is obtained, the second calculating module 65 provides a data file comprising a list of waypoints 53A, and a list of paths 53B between the waypoints 53A.

The data file provided by the second calculating module 65 further advantageously includes a list of headings TCA between the waypoints 53A, a list of distances DST between the waypoints 53A, a list of wind components COMP between the waypoints 53A, a list of true air speeds TAS between the waypoints 53A, a list of ground speeds GS between the waypoints 53A, a list of static air temperatures SAT between the waypoints 53A, a list of turbulence levels SHR between the waypoints 53A, a list of estimated times of arrival ETA at a waypoint 53A, and a list of estimated en route times EET.

This data file can be recovered by the crew and/or loaded by manual entry or by data transfer in the flight management system 14, in order to be used during the flight.

A mission calculation method, implemented using the system 10, will now be described.

This method is for example implemented during the preparation of the mission, to establish its feasibility, to prepare the mission more precisely, or to account for a last-minute change in a mission that has already been prepared.

Alternatively, this method is implemented during monitoring of the mission, or to test change hypotheses of the mission, to optimize it, or to reconfigure it.

Initially, the user, in particular the crew, enters at least a portion of the operational specifications using the configuration interface 42. The user for example defines, for each step of the mission, the geographical point of origin 18, the geographical destination point 20, and optionally, a number of passengers to be transported, a desired airspeed, an imposed departure time and/or arrival time, a maximum distance to be traveled.

Then, when he wishes to define a possible path, he activates the calculating engine 40. The initialization module 58 recovers the operational specifications in particular from the interface 42 in order to obtain all of the information on each step of the mission.

The initialization module 58 advantageously recovers other operational specifications from the management and monitoring system 16 of the aircraft.

This step initializes the operational specifications related to the mission context and the airplane context, for example the presence of failures or dispatches. This step also initializes the passenger comfort operational specifications, in particular in terms of connectivity and turbulence level. This step for specifying acceptable weather data is advantageously done at the user interface 42.

The initialization is advantageously done considering a purely orthodromic path in a standard atmosphere ("perfect" flight data).

Then, the weather context recovery module 60 queries the weather database 50 in particular to obtain the speeds and directions of the wind between the point of origin 18 and the destination point 20, at several flight levels.

The airplane performance determining module 62 is then activated. The application 66 for determining the weight and balance determines the weight of the aircraft and the center of gravity of the aircraft (Zero Fuel Weight and Zero Fuel Weight Center of Gravity), based on the empty weight of the aircraft, equipment on board the aircraft, passengers and/or freight on board, and their position in the aircraft.

On this basis, based on the weather context recovered by the recovery module 60, based on the airplane context recovered from the initialization module 58, and based on the desired airspeed, the high-speed performance determining application 68 determines an initial path 90 of the aircraft and the associated consumption of the aircraft using the position of the center of gravity determined by the application 66.

The application 68 then calculates the set of mission parameters, in particular the route, the arrival time, the flight profile and the fuel consumption, which in particular makes it possible to deduce the weight at takeoff therefrom.

The first path calculation module 64 is then implemented. Based on the weight at takeoff previously obtained, the first calculation module 64 calculates a first optimized path by determining the iso-movement curves of the aircraft, here the isochronous curves 80, from the position of the point of origin 18 to the position of the destination point 20.

As illustrated by FIG. 5, from the geographical point of origin 18, the first calculation module 64 determines the position of each point 82 of the isochronous curve 80 accessible to the aircraft from the geographical point of origin 18 at a given time δt that corresponds to one or several time increments. Each time increment is for example between 1 minute and 1 hour, in particular between 2 minutes and 10 minutes, for example 5 minutes.

Then, as illustrated in FIG. 6, each following isochronous curve 80 is determined by the first calculation module 64 from a given point 82 by calculating, from the given point 82, all of the points 84 accessible to the aircraft, at a given airspeed, taking account of the weather context, in particular the wind direction and intensity, as provided by the recovery module 60 and the airplane performance, as determined by the determining module 62.

The first calculation module 64 in particular accounts for the prohibited flight zones 24 or levels, zones 28 with dangerous weather phenomena to be avoided, turbulence zones 30 to be avoided and/or satellite coverage zones 32.

In the example illustrated in FIG. 7, the first calculation module 64 divides the space from the geographical point of origin 18 into angular sectors 86 from the geographical point of origin 18, each angular sector having an angular expanse smaller than 90°.

Then, as illustrated by FIG. 8, the first calculation module 64 selects, in each angular sector 86, the point 84 of maximum distance from the geographical point of origin 18, in order to build the following isochronous curve 80.

The calculation module 64 next defines an optimal path 64A making it possible to reach the geographical destination point 20 in a minimal time. The first calculation module 64 chooses, from each point of the trajectory, a later point of the trajectory located on an isochronous curve 80.

Figure 17:
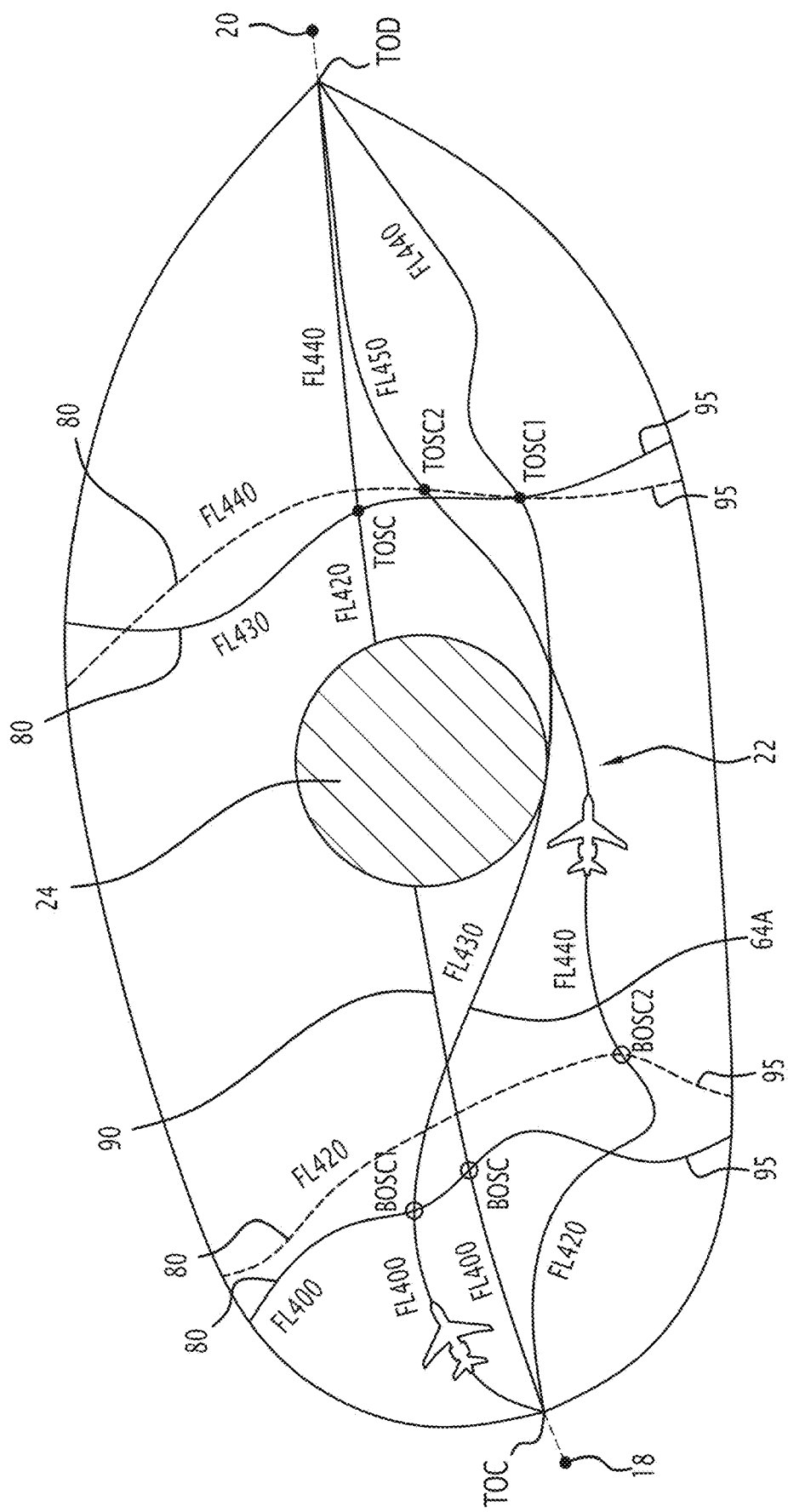
FIG. 17 is a schematic top view illustrating the implementation of a path calculation method using the calculating engine of the mission calculating system according to an embodiment of the invention.

Advantageously, in reference to FIG. 17, when the first calculation module 64 varies the flight levels, it chooses the path segments corresponding to the optimal combination of vertical flight levels upon each iteration, from a top of climb (TOC) calculated from the position of the point of origin 18 to a top of descent (TOD) calculated from the position of the destination point 20.

In this case, the iso-movement curves of the aircraft are determined by time increments, for several combinations of vertical flight levels (FL400, FL420, etc.), for example choosing, as base, the flight levels defined by the previous path.

As indicated above, the first calculation module 64 in particular accounts for the prohibited flight zones 24 or levels, zones 28 with dangerous weather phenomena to be avoided, turbulence zones 30 and/or satellite coverage zones 32.

For each flight level, once the isochrones are determined, the first calculation module 64 chooses, from each point 82 of the path, a later point of the path located on an isochronous curve 80. The first calculation module 64 thus defines one possible path segment associated with each flight level.

The first calculation module 64 limits the number of possible flight levels for each increment while keeping the flight level constant up to at least one flight level change curve 95. The flight level change curve 95 is for example defined for each flight level by a given fuel dumping, corresponding to a predefined flight duration at constant Mach, for example between 1 h and 2 h.

The first calculation module 64 next defines an optimal path 64A by choosing the path segments corresponding to the combination of vertical flight levels that is optimal in each iteration.

Thus, in the example shown in FIG. 17, the first calculation module 64 determines the iso-movement curves corresponding to a plurality of flight levels (e.g., FL400 and FL420) from an initial point (here the TOC) to the first flight level change curve 95 to define at least a first path segment [TOC; BOSC1], [TOC; BOSC2] for each flight level, then the iso-movement curves from the first flight level change curve 95 for a plurality of flight levels (here FL430, FL440) to another flight level change curve 95 to define at least a second path segment [BOSC1; TOSC1], [BOSC2; TOSC2] and repeats these calculations until reaching a final point (here the TOD). It next defines at least one optimal path 64A by associating successive path segments from among the path segments defined for each plurality of flight levels between the flight level change curves 95.

The optimal path 64A is obtained upon each iteration in a manner non constrained by the network of waypoints 53A and/or imposed paths 53B between the waypoints 53A.

Then upon each iteration, as illustrated in FIG. 3, the definition module 63 defines the optimization region 63A of the path around the optimal path 64A as a function of a predetermined lateral distance from each point of the optimal path 64A defined by the first calculating module 64 and as a function of the operational mission specifications, in particular the mission context, in particular navigation constraints, weather constraints, and passenger comfort constraints.

Advantageously, the definition module 63 laterally delimits the optimization region 63A of the path 64A by lateral limits extending laterally at a distance chosen as a function of the density of the air network of each point of the optimal path 64A.

Thus, the optimization region 63A is generally defined by a band encompassing the path 64A. As previously indicated, the band is also potentially constrained by the prohibited flight zones 24, dangerous weather phenomena zones 28 and/or turbulence zones 30. Depending on the case, it encompasses the satellite coverage zones 32.

Figure 10:
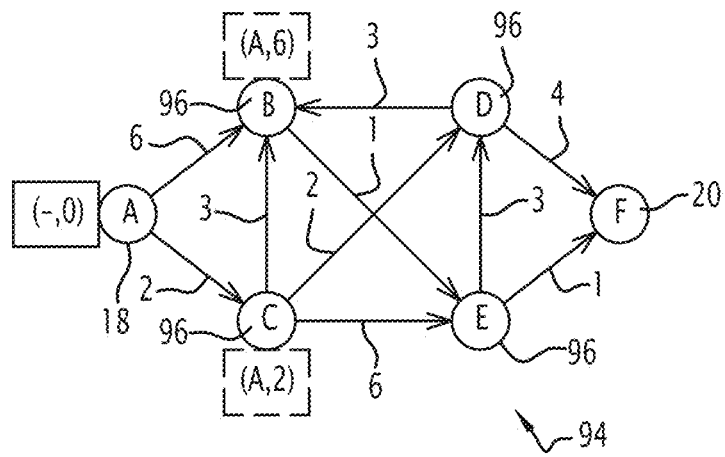

Next, as illustrated by FIG. 10, the definition application 92 loads the coordinates of waypoints 53A and imposed paths 53B between the waypoints 53A from the database 52, within the optimization region 63A.

The definition application 92 defines, among the waypoints 53A, the nodes 96 that are the possible waypoints 53A for the aircraft in particular taking into account mission constraints, in particular navigation constraints, weather constraints, passenger comfort constraints.

The definition application 93 further defines the cost associated with the passage between two adjacent nodes 96 based on the geographical distance separating the two nodes 96, and also the weather context recovered from the module 60, and optionally the airplane context, for example the type and age of the engines, recovered from the initialization module 58.

The determination application 98 for the optimized path 65A next implements a cost minimization algorithm in order to define the least expensive path passing through the nodes 96 and through the imposed paths between the nodes 96, from the geographical point of origin 18 to the geographical destination point 20. This algorithm is for example a Dijkstra algorithm.

In reference to FIGS. 9 to 16, the Dijkstra algorithm gradually builds a sub-graph in which the different nodes 96 are classified by increasing order of their minimal cost at their geographical point of origin 18. The cost associated with each node 96 corresponds to the sum of the costs of the paths followed between the nodes 96.

Before the first iteration, the costs of each node at the geographical point of origin 18 are infinite, except for the geographical point of origin 18 for which the cost is nil. The initial sub-graph is the empty set.

Figure 12:
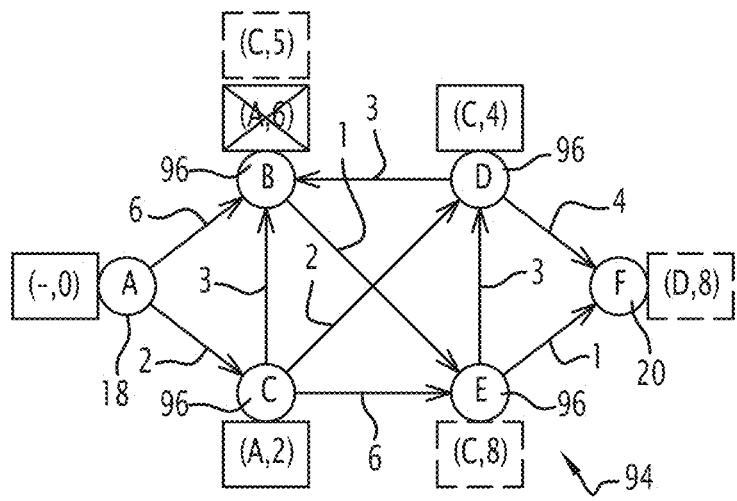

During each iteration, the determining application 98 chooses, outside the sub-graph, a node 96 of minimal cost and adds it to the sub-graph. Thus, as illustrated by FIGS. 11 and 12, the node C in FIG. 11 is that which has the minimal cost. Likewise, in the following iteration, visible in FIG. 12, the node D is that which has the minimal cost.

In each iteration, the determining application 98 updates the costs of the nodes 96 adjacent to that which is added by calculating the new cost of the adjacent node adding the cost of the path between the adjacent nodes 96 and the added node 96 to the cost already associated with the node previously added 96.

For example, in FIG. 11, the node C is reached and the cost associated with each respective node B, D, E adjacent to the node C added in the previous iteration is calculated as the sum of the cost to go from the geographical point of origin 18 to the added node C, plus the cost to go from the added node C to the respective node B, D, E.

Figure 13:
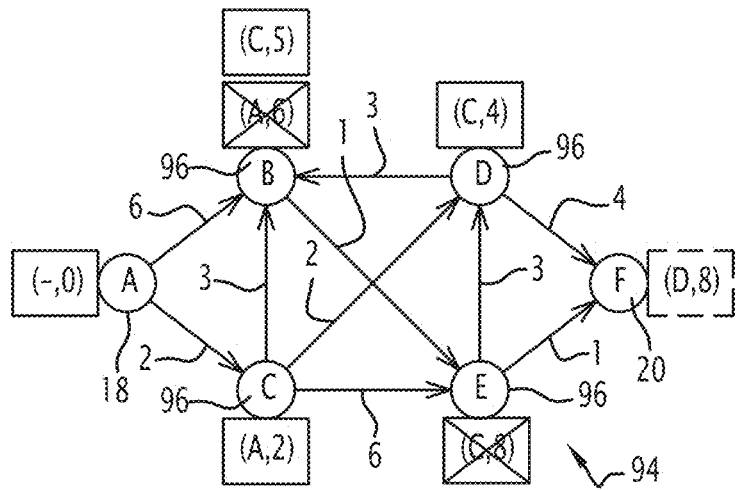
Figure 14:
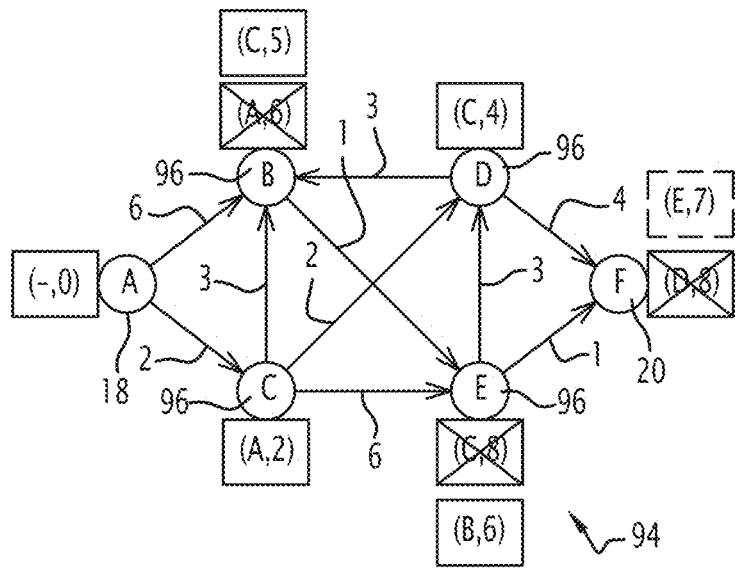
Figure 15:
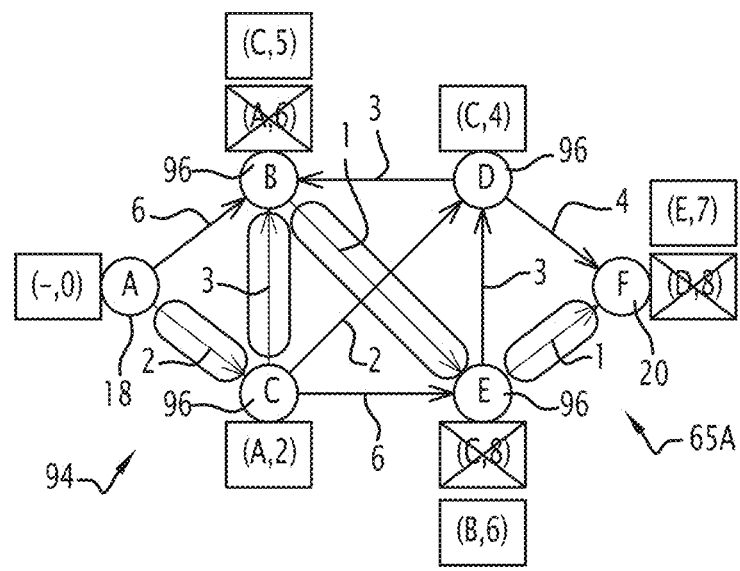

As illustrated in FIG. 13, the geographical arrival point 20 does not correspond to a cost minimum, since the cost to reach it is greater than that to reach the point E. Other alternative paths are tested on the same principle as that previously described (see FIG. 14). As illustrated by FIG. 15, the algorithm stops when it has determined the minimal cost path to reach the geographical arrival point 20. An optimized path 65A is then obtained by minimizing the cost.

The optimized path 65A obtained upon each iteration is constrained by a network of waypoints 53A and imposed paths 53B between the waypoints 53A in the air network.

The calculating engine 40 then calculates the set of mission parameters based on the optimized path 65A obtained in the current iteration, advantageously by using the application of high-speed performance 68 and determines the difference between the mission parameter to be optimized (for example, the weight at takeoff) for the initial path and the mission parameter to be optimized for the optimized path 65A.

The calculation engine then performs new path calculations 64A, 65A, as previously described, by using the isochronous curves 80 until the mission parameter, here the weight at takeoff, converges toward a desired mission parameter value.

The convergence is for example determined when the difference between the value of the mission parameter for the path determined in the previous iteration and that determined in the current iteration is below a predetermined value.

In particular, in the case of the weight at takeoff, the difference between the weight at takeoff for the path determined in the previous iteration and that determined in the current iteration must be below a predetermined weight, for example equal to 100 pounds.

Alternatively, the mission parameter is the weight at landing or the distance traveled along the path.

Advantageously, upon each iteration or after convergence, the low-speed performance determining software application 70 is implemented to verify that the obtained mission parameters are compatible with the terrain on which the aircraft is intended to take off and/or land.

The calculating engine 40 then establishes a data file comprising a list of waypoints 53A, and a list of paths 53B between the waypoints 53A.

As indicated above, the data file provided by the second calculation module 65 further advantageously includes a list of headings TCA between the waypoints 53A, a list of distances DST between the waypoints 53A, a list of wind components COMP between the waypoints 53A, a list of true air speeds TAS between the waypoints 53A, a list of ground speeds GS between the waypoints 53A, a list of static air temperatures SAT between the waypoints 53A, a list of turbulence levels SHR between the waypoints 53A, a list of estimated times of arrival ETA at a waypoint 53A, and a list of estimated en route times EET.

The calculation system 10 is therefore particularly effective to determine optimal paths 65A of an aircraft during a mission, much more precisely than with the conventional commercial tools, taking into account the mission context and the airplane context, while limiting the computing power necessary for the combined use of an in-flight calculation method without restrictions, and a calculation algorithm optimizing the route with navigation constraints imposed by the waypoints and paths defined by the air traffic control authorities.

Hybridizing methods therefore makes it possible to obtain, with a minimal time and computing power, an optimized path 65A that generates significant time savings for the aircraft relative to a path 110 obtained by a commercial system, while being suitable for zones 24, 28, 30 to be avoided, and also zones 32 in which the aircraft must travel.

Figure 16:
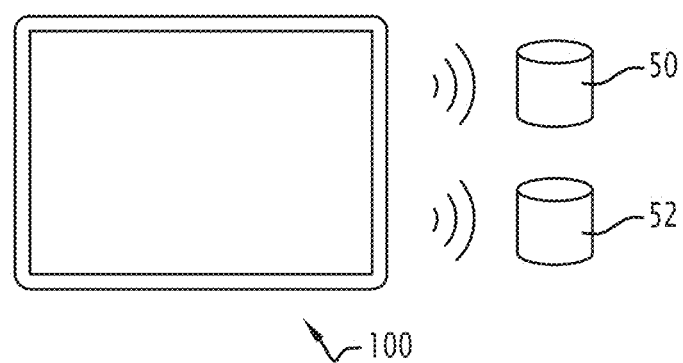
FIG. 16 is a schematic view illustrating a second mission calculating system according to an embodiment of the invention.

In the variant illustrated in FIG. 16, the calculation system of 10 is integrated within an electronic flight bag (EFB) or a portable electronic device 100.

The portable electronic device 100 is for example connected to the databases 50, 52 by a wireless datalink according to a wireless transmission protocol for example of the Wi-Fi type (for example according to Standard IEEE 802.11) or the Bluetooth type (for example according to Standard IEEE 802.15-1-2005).

In another alternative, each iso-movement curve calculated by the calculation module 64 is a fuel iso-consumption curve.

The first calculation module 64 is configured, from any point 82 of a path 22 in progress, for establishing at least one fuel iso-consumption curve over a preset consumed fuel increment from a point 82 of the path, taking account of the selected airspeed, the weather context, airplane performance determined by the determining module 62, and operational specifications defined by the initialization module 58. It is next configured to choose a path by basing itself on the determined fuel iso-consumption curves.

By definition, a fuel iso-consumption curve is a curve connecting the points accessible to the aircraft from a given point 82 with a given fuel consumption, which corresponds to one or several consumed fuel increments. Each consumed time increment is chosen at a constant value for example of between 22.7 kg (50 pounds) and 453.6 kg (1000 pounds), in particular between 36.3 kg (80 pounds) and 54.4 kg (120 pounds).

In this example, each fuel iso-consumption curve is determined from a given point 82 by calculating, from the given point 82, all of the points 84 accessible to the aircraft, at a given airspeed, taking account of the weather context, in particular the wind direction and intensity, as provided by the recovery module 60 and the airplane performance, as determined by the determining module 62.

The first calculation module 64 is configured to calculate a series of fuel iso-consumption curves, by calculating, from each point 82 of a given fuel iso-consumption curve, all of the points accessible to the aircraft for a given fuel increment for the given speed, as described above for the isochrones, then repeating this calculation from any point of the fuel iso-consumption curve thus calculated.

Like before, the first calculation module 64 is configured for selectively excluding the points that are located in the prohibited flight zones or levels 24, in zones 28 with dangerous weather phenomena and/or in turbulent zones 30. On the contrary, the first calculation module 64 is also configured to exclude the points that are not located in a satellite coverage zone 32.

The first calculating module 64 is next configured to define an optimal path 64A by choosing, on successive fuel iso-consumption curves, successive points of the optimal path 64A.

In the embodiments that have been previously described, the mission calculation includes determining a three-dimensional path in which the flight levels are optimized in addition to the route on each segment corresponding to a flight level.

In a variant, the system 10 is configured to calculate only an optimal path corresponding to a two-dimensional route with a single flight level between the geographical point of origin 18 and the geographical destination point 20.

What is claimed is:

1. A system comprising:
   a flight management system configured to aid a pilot of an aircraft in navigating the aircraft during a mission; and
   an aircraft mission generation system configured to generate an aircraft path during the mission, the aircraft mission generation system comprising a memory and a processor, the memory containing software configured for being executed by the processor to:
   query a weather database containing current and predictive weather information in a navigation zone of the aircraft in a mission volume extending between a geographical point of origin and a geographical destination point of the mission, to determine the weather context, the current and the predictive weather information including the speeds and directions of the wind in the mission volume extending between the point of origin and the destination point, at several flight levels;
   generate an optimal mission path between a geographical point of origin and a geographical destination point as a function of airplane performance, operational mission specifications and the weather context, in a mission space between the geographical point of origin and the geographical destination point, the optimal mission path being generated in a manner non-constrained by any network of waypoints and/or paths imposed between the waypoints, the optimal mission path being generated as if the aircraft was able to perform a free flight taking into account mission's specifications, aircraft performance and weather context, without taking into account any network of waypoints and/or imposed paths between the waypoints, the aircraft mission generation system being configured to define, around the optimal mission path, an optimization region of the optimal mission path, the optimization region of the aircraft path being defined as a function of a predetermined lateral distance from each point of the optimal mission path and as a function of the operational mission specifications;
   generate an optimized path of the aircraft in the optimization region in a manner constrained by a defined network of waypoints and/or paths imposed between the defined network waypoints, taking the weather context into account,
   the generating of the optimized path including defining, in the optimization region of the optimal mission path, a network of nodes between the geographical point of origin and the geographical destination point from the defined network of waypoints and/or paths imposed between the defined network waypoints,
   the generating of the optimized path including querying a navigation information database to load the coordinates of the defined network of waypoints and/or paths imposed between the defined network waypoints from the navigation information database, within the optimization region, as defined by air traffic authorities in each country; and
   generate a data file including the generated optimized path of the aircraft in the optimization region for input into the flight management system for aiding the pilot in navigating the aircraft during the mission,
   and guide the aircraft to cause the aircraft to follow the generated optimized path.

2. The system according to claim 1, wherein the optimization region of the optimal mission path is delimited by lateral limits extending laterally at a distance chosen as a function of a density of the network of waypoints and/or the paths imposed between the waypoints.

3. The system according to claim 1, wherein
   the aircraft mission generation system is configured to define a cost associated with a passage from one node to an adjacent node among the nodes of the network and to determine the optimized path based on a minimization of a total cumulative cost between the geographical point of origin and the geographical destination point.

4. The system according to claim 3, wherein the aircraft mission generation system is configured to implement a Dijkstra algorithm and/or an A* algorithm to define the cost associated with a passage from one node to an adjacent node among the nodes of the network and to determine the optimized path based on the minimization of the total cumulative cost between the geographical point of origin and the geographical destination point.

5. The system according to claim 1, wherein the aircraft mission generation system is configured to generate at least one iso-movement curve of the aircraft, from at least one point of the optimal mission path and is configured to determine at least one other point of the optimal mission path on the iso-movement curve of the aircraft.

6. The system according to claim 5, wherein the at least one iso-movement curve of the aircraft is an isochronous curve and/or a fuel iso-consumption curve.

7. The system according to claim 5, wherein each point of the optimal mission path is located on an iso-movement curve relative to another point of the optimal mission path, the aircraft mission generation system being configured to choose each point of the optimal mission path on the iso-movement curve as a function of operational and/or performance airplane specifications.

8. The system according to claim 5, wherein the aircraft mission generation system is configured to generate a plurality of iso-movement curves on several flight levels from the at least one point of the optimal mission path.

9. The system according to claim 8, wherein the aircraft mission generation system is configured to generate the iso-movement curves corresponding to a plurality of flight levels from an initial point to a first flight level change curve to define at least a first path segment for each flight level, then the iso-movement curves from the first flight level change curve for a plurality of flight levels to another flight level change curve to define at least a second path segment for each flight level, then next to define the optimal mission path by combining successive path segments chosen from among the path segments defined for each plurality of flight levels.

10. The system according to claim 5, wherein the aircraft mission generation system is configured to divide the space into a plurality of angular sectors from the geographical point of origin or from the geographical destination point, and to select each point of an iso-movement curve at a given moment relative to a point of an iso-movement curve at an earlier moment as the point located at a maximum distance from the geographical point of origin or at a minimum distance from the geographical destination point in each angular sector.

11. The system according to claim 1, wherein the aircraft mission generation system is configured to:
 initialize specifications of a mission including at least the geographical point of origin, the geographical destination point, and the operational mission specifications;
 recover the weather context, in the mission space extending between the geographical point of origin and the geographical destination point; and
 determine the airplane performance, the aircraft mission generation system being configured to determine the airplane performance based on operational mission specifications and the weather context.

12. The system according to claim 1, wherein the or each operational specification includes an airplane context and/or includes a mission context.

13. The system according to claim 12, wherein the airplane context is a type of defective equipment, a dispatch or a failure.

14. The system according to claim 12, wherein the mission context is a weather zone to avoid, a prohibited zone or a desired passage zone.

15. The system according to claim 1, wherein the weather context is evolutive.

16. A method for generating a mission of an aircraft, including:
 querying a weather database containing current and predictive weather information in a navigation zone of the aircraft in a mission volume extending between the point of origin and the destination point, to determine the weather context, the current and the predictive weather information including speeds and directions of the wind in the mission volume extending between the point of origin and the destination point, at several flight levels;
 generating a first optimal mission path between a geographical point of origin and a geographical destination point as a function of airplane performance, operational mission specifications and the weather context, in a mission space between the geographical point of origin and the geographical destination point, the generating of the first optimal mission path being done in a manner non constrained by any network of waypoints and/or paths imposed between the waypoints, the optimal mission path being generating as if the aircraft was able to perform a free flight taking into account mission's specifications, aircraft performance and weather context, without taking into account any network of waypoints and/or imposed paths between the waypoints;
 defining an optimization region of the first optimal mission path around the first optimal mission path, the optimization region of the aircraft path being defined as a function of a predetermined lateral distance from each point of the optimal mission path and as a function of the operational mission specifications;
 generating an optimized path of the aircraft in the optimization region in a manner constrained by a defined network of waypoints and/or paths imposed between the defined network of waypoints, taking the weather context into account,
 the generating of the optimized path including defining, in the optimization region of the optimal mission path, a network of nodes between the geographical point of origin and the geographical destination point from the defined network of waypoints and/or paths imposed between the defined network of waypoints,
 the generating of the optimized path including querying a navigation information database to load the coordinates of the defined network of waypoints and/or paths imposed between the defined network of waypoints from the navigation information database, within the optimization region, as defined by air traffic authorities in each country; and
 generating a data file including the generated optimized path of the aircraft in the optimization region for input into a flight management system of the aircraft for aiding the pilot in navigating the aircraft during the mission,
 and guiding the aircraft to cause the aircraft to follow the generated optimized path.

17. The method according to claim 16, wherein the optimization region of the path is defined as a function of a predetermined lateral distance from each point of the optimal path and as a function of the operational mission specifications.

18. The method according to claim 16, wherein the generating of the optimized path includes defining, in the optimization region, a network of nodes between the geographical point of origin and the geographical destination point from the network of waypoints and/or paths imposed between the waypoints, defining a cost associated with a passage from one node to an adjacent node among the nodes of the network and determining the optimized path based on a minimization of a total cumulative cost between the geographical point of origin and the geographical destination point.

19. The method according to claim 16, wherein the weather context is evolutive.

20. A system comprising:
 a flight management system configured to aid a pilot of an aircraft in navigating the aircraft during a mission; and
 an aircraft mission generation system configured to generate an aircraft path during the mission, the aircraft mission generation system comprising a memory and a processor, the memory containing software configured for being executed by the processor to:
 query a weather database containing current and predictive weather information in a navigation zone of the aircraft in a mission volume extending between a geographical point of origin and a geographical destination point of the mission, to determine the weather context, the current and the predictive weather information including the speeds and directions of the wind in the mission volume extending between the point of origin and the destination point, at several flight levels:
 generate an optimal mission path between a geographical point of origin and a geographical destination point as a function of airplane performance, operational mission specifications and the weather context, in a mission space between the geographical point of origin and the geographical destination point, the optimal mission path being generated in a manner non-constrained by any network of waypoints and/or paths imposed between the waypoints, the aircraft mission generation system being configured to define, around the optimal mission path, an optimization region of the optimal mission path;

generate an optimized path of the aircraft in the optimization region in a manner constrained by a defined network of waypoints and/or paths imposed between the defined network of waypoints, taking the weather context into account, the generating of the optimized path including defining, in the optimization region of the optimal mission path, a network of nodes between the geographical point of origin and the geographical destination point from the defined network of waypoints and/or paths imposed between the defined network of waypoints, the generating of the optimized path including querying a navigation information database to load the coordinates of the defined network of waypoints and paths imposed between the defined network of waypoints from the database, within the optimization region, as defined by air traffic authorities in each country; and generate a data file including the generated optimized path of the aircraft in the optimization region for input into the flight management system for aiding the pilot in navigating the aircraft during the mission, and guiding the aircraft to cause the aircraft to follow the generated optimized path, wherein the optimization region of the aircraft path is defined as a function of a predetermined lateral distance from each point of the optimal mission path and as a function of the operational mission specifications, wherein the optimization region of the optimal mission path is delimited by lateral limits extending laterally at a distance chosen as a function of a density of the defined network of waypoints and the paths imposed between the defined network of waypoints.

* * * * *